US012106622B2

(12) United States Patent
Hirasawa et al.

(10) Patent No.: US 12,106,622 B2
(45) Date of Patent: Oct. 1, 2024

(54) VISITOR MANAGEMENT SYSTEM AND VISITOR MANAGEMENT METHOD

(71) Applicant: PANASONIC INTELLECTUAL PROPERTY MANAGEMENT CO., LTD., Osaka (JP)

(72) Inventors: Sonoko Hirasawa, Kanagawa (JP); Takayuki Matsukawa, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 273 days.

(21) Appl. No.: 17/613,811

(22) PCT Filed: May 12, 2020

(86) PCT No.: PCT/JP2020/018998
§ 371 (c)(1),
(2) Date: Nov. 23, 2021

(87) PCT Pub. No.: WO2020/255588
PCT Pub. Date: Dec. 24, 2020

(65) Prior Publication Data
US 2022/0237970 A1    Jul. 28, 2022

(30) Foreign Application Priority Data

Jun. 19, 2019    (JP) .................................. 2019-113529

(51) Int. Cl.
*G07C 9/20* (2020.01)
*G06Q 10/02* (2012.01)
(Continued)

(52) U.S. Cl.
CPC ............... *G07C 9/20* (2020.01); *G06Q 10/02* (2013.01); *G06V 20/52* (2022.01); *G06V 40/10* (2022.01)

(58) Field of Classification Search
CPC .......... G07C 9/20; G06V 20/52; G06V 40/10; G06Q 10/02
(Continued)

(56) References Cited

U.S. PATENT DOCUMENTS

2014/0305352 A1* 10/2014 Dowling ................. G07F 9/009
109/38
2015/0294515 A1* 10/2015 Bergdale ................. H04W 4/80
340/5.61
(Continued)

FOREIGN PATENT DOCUMENTS

JP      H07-78277           3/1995
JP      2002297823      * 10/2002 ............. G06Q 10/02
(Continued)

OTHER PUBLICATIONS

Sky or Ground, IT Gets You Moving, Businessline [Chennai] (Year: 2018).*
(Continued)

*Primary Examiner* — Jeff Zimmerman
*Assistant Examiner* — Mark C Clare
(74) *Attorney, Agent, or Firm* — GREENBLUM & BERNSTEIN, P.L.C.

(57) ABSTRACT

A visitor management system, which can accurately determine if a visitor presents a proper ticket for the visitor's personal attribute, includes: a reader configured to read ticket information in a ticket medium; a camera configured to capture an image of the visitor; a control device configured to acquire a personal attribute of the visitor from the captured image, determine if consistency is achieved between the ticket information from the reader and the acquired personal attribute, and generate a management screen including determination result information; and a display configured to display the management screen. The (Continued)

determination result information generated by the control device may include a number of persons for each ticket type and a number of persons for each personal attribute, and inconsistency information indicating that consistency is not achieved.

5 Claims, 12 Drawing Sheets

(51) Int. Cl.
*G06V 20/52* (2022.01)
*G06V 40/10* (2022.01)

(58) Field of Classification Search
USPC .............................................................. 705/5
See application file for complete search history.

(56) References Cited

U.S. PATENT DOCUMENTS

| | | | | |
|---|---|---|---|---|
| 2015/0317841 A1* | 11/2015 | Karsch | ................... | G06V 20/52 |
| | | | | 348/149 |
| 2018/0253629 A1* | 9/2018 | Bamba | ............... | G06F 18/2148 |

FOREIGN PATENT DOCUMENTS

| | | | | |
|---|---|---|---|---|
| JP | 2004-213499 | | 7/2004 | |
| JP | 2008-123392 | | 5/2008 | |
| JP | 2008-134729 | | 6/2008 | |
| JP | 2009-205495 | | 9/2009 | |
| JP | 2011191953 | * | 3/2010 | ............. G07B 11/02 |
| JP | 2010-204768 | | 9/2010 | |
| JP | 2014-126998 | | 7/2014 | |
| JP | 2015-011597 | | 1/2015 | |
| JP | 2016014936 | * | 1/2016 | ............. G07B 15/00 |
| JP | 5856726 | | 2/2016 | |
| JP | 2016134144 | * | 7/2016 | ............... G06T 1/00 |
| JP | 2017054355 | * | 3/2017 | ............. G06Q 50/30 |
| JP | 2019-087130 | | 6/2019 | |

OTHER PUBLICATIONS

Office Action issued by the China National Intellectual Property Administration (CNIPA) in Chinese Patent Application No. 202080043885.7, dated Feb. 11, 2023, together with an English language translation.
JP Office Action for Application No. 2023-138877, dated May 21, 2024, English translation.

* cited by examiner

|  | total | breakdown | | |
|---|---|---|---|---|
|  |  | adult | child | infant |
| # of read tickets | 1 | 1 | 0 | 0 |
| # of in-gate persons | 1 | 1 | 0 | 0 |

(A-2)

|  | total | breakdown | | |
|---|---|---|---|---|
|  |  | adult | child | infant |
| # of read tickets | 1 | 0 | 1 | 0 |
| # of in-gate persons | 1 | 0 | 1 | 0 |

(A-3)

|  | total | breakdown | | |
|---|---|---|---|---|
|  |  | adult | child | infant |
| # of read tickets | 2 | 1 | 1 | 0 |
| # of in-gate persons | 2 | 1 | 1 | 0 |

(A-4)

|  | total | breakdown | | |
|---|---|---|---|---|
|  |  | adult | child | infant |
| # of read tickets | 2 | 1 | 0 | 1 |
| # of in-gate persons | 2 | 1 | 0 | 1 |

detection info read: adult 1 adult: 1
child: 0

(B-1)

detection info read: child 1 adult: 0
child: 1

(B-2)

detection info read: adult 1, child 1 adult: 1
child: 1

(B-3)

detection info read: adult 1, infant 1 adult: 1
infant: 1

| | total | breakdown | | |
|---|---|---|---|---|
| | | adult | child | infant |
| # of read tickets | 1 | 0 | 1 | 0 |
| # of in-gate persons | 2 | 1 | 1 | 0 |

| | total | breakdown | | |
|---|---|---|---|---|
| | | adult | child | infant |
| # of read tickets | 1 | 0 | 1 | 0 |
| # of in-gate persons | 2 | 0 | 2 | 0 |

| | total | breakdown | | |
|---|---|---|---|---|
| | | adult | child | infant |
| # of read tickets | 2 | 1 | 1 | 0 |
| # of in-gate persons | 3 | 1 | 1 | 1 |

| | total | breakdown | | |
|---|---|---|---|---|
| | | adult | child | infant |
| # of read tickets | 2 | 1 | 1 | 0 |
| # of in-gate persons | 3 | 1 | 2 | 0 | detection info
read: child 1 adult: 1
child: 1

※tailgating※ visual check detection info
read: child 1 adult: 0
children: 2

※tailgating※ visual check detection info
read: adult 1, infant 1 adult: 1
infants: 2 tailgating
※ (infant held in arms) ※ visual check detection info
read: adult 1, infant 1 adult: 1
children: 2

※tailgating※ visual check

| | total | breakdown | | |
|---|---|---|---|---|
| | | adult | child | infant |
| # of read tickets | 2 | 1 | 1 | 0 |
| # of in-gate persons | 1 | 1 | 0 | 0 |

| | total | breakdown | | |
|---|---|---|---|---|
| | | adult | child | infant |
| # of read tickets | 2 | 1 | 0 | 1 |
| # of in-gate persons | 1 | 1 | 0 | 0 | detection info read: adult 1, child 1 adult: 1
child: 0

※ ticket count inconsistency ※ visual check detection info read: adult 1, infant 1 adult: 1
infant: 0

※ ticket count inconsistency ※ visual check

| | total | breakdown | | |
|---|---|---|---|---|
| | | adult | child | infant |
| # of read tickets | 2 | 1 | 1 | 0 |
| # of in-gate persons | 2 | 2 | 0 | 0 | detection info read: adult 1, child 1 adults: 2
child: 0 ticket count
※inconsistency※ visual check

VISITOR MANAGEMENT SYSTEM AND VISITOR MANAGEMENT METHOD

TECHNICAL FIELD

The present invention relates to a visitor management system and a visitor management method for providing admission to a visitor based on ticket information presented by the visitor.

BACKGROUND ART

Transportation facilities such as airports, train stations, and entertainment parks use systems for checking whether or not a visitor is a paying passenger by having the visitor present a purchased ticket for admission at each entrance gate (such as boarding gate or ticket gate). However, some visitors enter without paying admission fees by following a paying visitor (i.e., tailgating), resulting in that more visitors enter the gate than the total number of tickets presented by visitors. Other visitors fail to properly present their tickets, resulting in unauthorized entry. As there is a limit to what staff members can visually check in order to deal with such problems, various technologies have been proposed to prevent unauthorized entry.

Known technology to prevent unauthorized entry includes a method involving: measuring the number of visitors by using images captured by a camera; reading authorization tags possessed by the visitors to count the authorization tags; and comparing the number of visitors to the number of authorization tags to thereby determine if there is an unauthorized entry (tailgating) (Patent Document 1). Another such known technology is a method involving: measuring the number of visitors by using images captured by a camera; authenticating visitors based on information recorded in ID cards possessed by the visitors or through facial authentication, to acquire the number of authentication events; and comparing the number of visitors to the number of authorization events to thereby determine if there is an unauthorized entry (Patent Documents 2).

PRIOR ART DOCUMENT(S)

Patent Document(s)

Patent Document 1: JP2015-011597A
Patent Document 2: JP2008-134729A

SUMMARY OF THE INVENTION

Task to be Accomplished by the Invention

Tickets for admission generally have ticket types corresponding to personal attributes of visitors (such as adult, child, or infant), and a fee for ticket is different depending on the ticket type. Thus, some adult visitors do unauthorized entry using tickets for different personal attributes. Accordingly, it is necessary to check not only the consistency of the number of the visitors with that of tickets, but also the consistency of the number of visitors of each personal attribute with that of tickets of a corresponding type. However, systems of the prior art only compare the number of visitors with that of tickets, and are not capable of checking if there is an unauthorized entry using a ticket for a different personal attribute.

The present invention has been made in view of the problem of the prior art, and a primary object of the present invention is to provide a visitor management system and a visitor management method which can accurately determine whether or not a visitor properly presents a ticket of the type corresponding to a personal attribute of the visitor, thereby enabling a staff member to precisely confirm whether or not the visitor is authorized to enter.

Means to Accomplish the Task

An aspect of the present invention provides a visitor management system for providing admission to a visitor based on ticket information presented by the visitor, the system comprising: a reader configured to read ticket information recorded in a ticket medium possessed by the visitor; a camera configured to capture an image of the visitor; a data processing device configured to acquire a personal attribute of the visitor from the image of the visitor captured by the camera, determine whether or not consistency is achieved between the ticket information acquired by the reader and the acquired personal attribute of the visitor to thereby provide determination result information, and generate a management screen including the determination result information; and a display configured to display the management screen generated by the data processing device.

Another aspect of the present invention provides a visitor management method for providing admission to a visitor based on ticket information presented by the visitor, the method being performed by a visitor management system, the method comprising: determining whether or not consistency is achieved between ticket information acquired by a reader from a ticket medium possessed by a visitor and a personal attribute of the visitor acquired from an image of the visitor captured by a camera, to thereby provide determination result information; generating a management screen including the determination result information; and displaying the generated management screen.

Effect of the Invention

According to the present disclosure, a system is configured to acquire a personal attribute of a visitor from an image of the visitor captured by a camera; determine whether consistency is achieved between information on a ticket presented by the visitor and the captured personal attribute to thereby provide determination result information; and display a management screen including the determination result information. This configuration can accurately determine whether or not a visitor properly presents a ticket of the type corresponding to a personal attribute of the visitor, thereby enabling a staff member to precisely confirm whether or not the visitor is authorized to enter.

BRIEF DESCRIPTION OF THE DRAWINGS

FIG. 5 is an explanatory diagram showing examples of normal states;

FIG. 7 is an explanatory diagram showing examples of inconsistent states in which inconsistencies occur regarding the numbers of persons;

DESCRIPTION OF THE PREFERRED EMBODIMENT(S)

Figure 1:
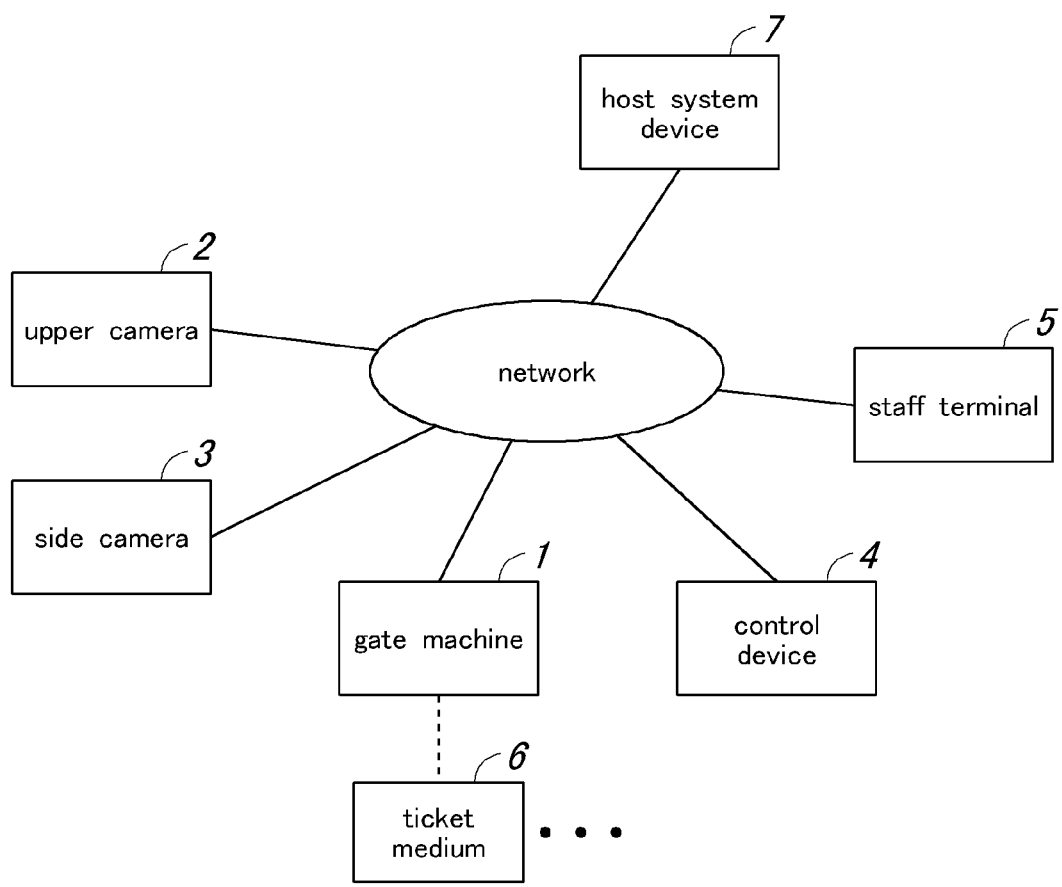
FIG. 1 is a diagram showing a general configuration of a visitor management system according to an embodiment of the present invention.

A first aspect of the present invention made to achieve the above-described object is a visitor management system for providing admission to a visitor based on ticket information presented by the visitor, the system comprising: a reader configured to read ticket information recorded in a ticket medium possessed by the visitor; a camera configured to capture an image of the visitor; a data processing device configured to acquire a personal attribute of the visitor from the image of the visitor captured by the camera, determine whether or not consistency is achieved between the ticket information acquired by the reader and the acquired personal attribute of the visitor to thereby provide determination result information, and generate a management screen including the determination result information; and a display configured to display the management screen generated by the data processing device.

This system is configured to acquire a personal attribute of a visitor from an image of the visitor captured by a camera; determine whether consistency is achieved between information on a ticket presented by the visitor and the captured personal attribute to thereby provide determination result information; and display a management screen including the determination result information. This configuration can accurately determine whether or not a visitor properly presents a ticket of the type corresponding to a personal attribute of the visitor, thereby enabling a staff member to precisely confirm whether or not the visitor is authorized to enter.

A second aspect of the present invention is the visitor management system of the first aspect, wherein the data processing device generates, as the determination result information, a number of persons for each ticket type included in their ticket information and a number of persons for each personal attribute.

This configuration enables a staff member to confirm details of unauthorized entry.

A third aspect of the present invention is the visitor management system of the first aspect, wherein, when determining that consistency is not achieved between the ticket information and the personal attribute, the data processing device generates inconsistency information indicating that consistency is not achieved.

This configuration enables a staff member to quickly confirm an inconsistency between the type of a ticket presented by a visitor and the visitor's personal attribute.

A fourth aspect of the present invention is the visitor management system of the first aspect, wherein the data processing device generates, as the determination result information, tailgating information indicating a situation in which either a child or an infant, or both accompanied by the visitor are tailgating the visitor.

This configuration can notify a staff member of a situation in which either a child or an infant, or both accompanied by the visitor are tailgating the visitor.

A fifth aspect of the present invention is the visitor management system of the first aspect, wherein the data processing device detects that an infant is held by an adult visitor from the image captured by the camera, and generates, as the determination result information, raised infant information indicating a situation in which the infant is raised by the adult visitor.

This configuration can notify a staff member of a situation in which an infant is held by an adult visitor (an infant is in a held-in-arms state).

A sixth aspect of the present invention is the visitor management system of the first aspect, wherein the data processing device is configured to generate the management screen which includes a play button used to start a playback of the image captured by the camera.

This configuration enables a staff member to quickly confirm an actual state of a visitor from an image captured by the camera.

A seventh aspect of the present invention is a visitor management method for providing admission to a visitor based on ticket information presented by the visitor, the method being performed by a visitor management system, the method comprising: determining whether or not consistency is achieved between ticket information acquired by a reader from a ticket medium possessed by a visitor and a personal attribute of the visitor acquired from an image of the visitor captured by a camera, to thereby provide determination result information; generating a management screen including the determination result information; and displaying the generated management screen.

This configuration can accurately determine whether or not a visitor properly presents a ticket of the type corresponding to a personal attribute of the visitor, thereby enabling a staff member to precisely confirm whether or not the visitor is authorized to enter, in the same manner as the first aspect.

Embodiments of the present invention will be described below with reference to the drawings.

FIG. 1 is a diagram showing a general configuration of a visitor management system according to an embodiment of the present invention.

The visitor management system is used to authorize passengers (visitors) to board an airplane (i.e., to enter a boarding gate (entrance gate) at the airport) based on the tickets (boarding tickets) presented by the passengers (visitors), and the visitor management system includes a gate machine 1, an upper camera 2 (first camera), a side camera 3 (second camera), a control device 4 (data processing device), a staff terminal 5 (terminal device), and a ticket medium 6.

The gate machine 1 is typically a ticket gate machine, and is installed to restrict entry to a boarding passage toward an airplane. The gate machine 1 confirms if a proper ticket is presented by a passenger; that is, checks if the passenger is authorized to board an airplane.

The upper camera 2 and the side camera 3 are installed near the gate machine 1. The upper camera 2 shoots passengers passing through the gate machine 1 from above. The side camera 3 shoots passengers passing through the gate machine 1 from a side.

The control device 4 performs processing operations for visitor management. The control device 4 can communicate with the gate machine 1, the upper camera 2, the side camera 3, and the staff terminal 5 via communication paths such as a premises network in the airport. Furthermore, the control device 4 can communicate with a host system device 7 via a communication path such as a premises network.

The host system device 7 provides a higher level system (airport management system) with which the visitor management system is associated, and is configured to manage passenger ticket information, and provide the passenger ticket information to the control device 4.

The staff terminal 5 is carried by a staff member and may be a tablet terminal, a smartphone, or any other mobile device. The staff terminal 5 is configured to display a management screen indicating a status of the gate machine 1, and a status of a passenger passing through the gate machine 1, and any other type of information.

A ticket medium 6 is possessed by a passenger and records the passenger's ticket information. Specific examples of the ticket medium 6 includes an IC card or a smartphone equipped with an IC chip in which ticket information is stored, a paper on which a two-dimensional bar code is printed, and a smartphone configured to display a two-dimensional bar code on the screen. Information on a passenger's ticket recorded in the ticket medium 6 is read and provided to the control device 4 via the gate machine 1.

Although a system of the present embodiment will be described with reference to a system for a boarding gate in an airport, applications of the system of the present invention are not limited to such a system for a boarding gate in an airport. The system of the present invention may be applied to any entrance gate (ticket gate) for restricting entry to vehicle boarding areas (e.g., railway station platforms) at other facilities for public transportation such as railway, bus, or ship; that is, railway stations, bus terminals, boarding areas to ships. Furthermore, the system of the present invention may be applied not only to entrance gates for restricting entry to boarding areas for transportation, but also to entrance gates in other types of facilities such as entrance gates for restricting entry to entertainment parks.

Although, in the present embodiment, the system includes a control device 4 (e.g., a personal computer) configured to perform processing operations for visitor management, the control device 4 is not limited to a device installed in a facility (such as an airport) including the gate machine 1, and may be implemented as a cloud computer (data processing device). In the latter case, the system may be configured such that the gate machine 1, the upper camera 2, and the side camera 3 communicate with the cloud computer via a wide area network (such as the Internet).

Figure 2:
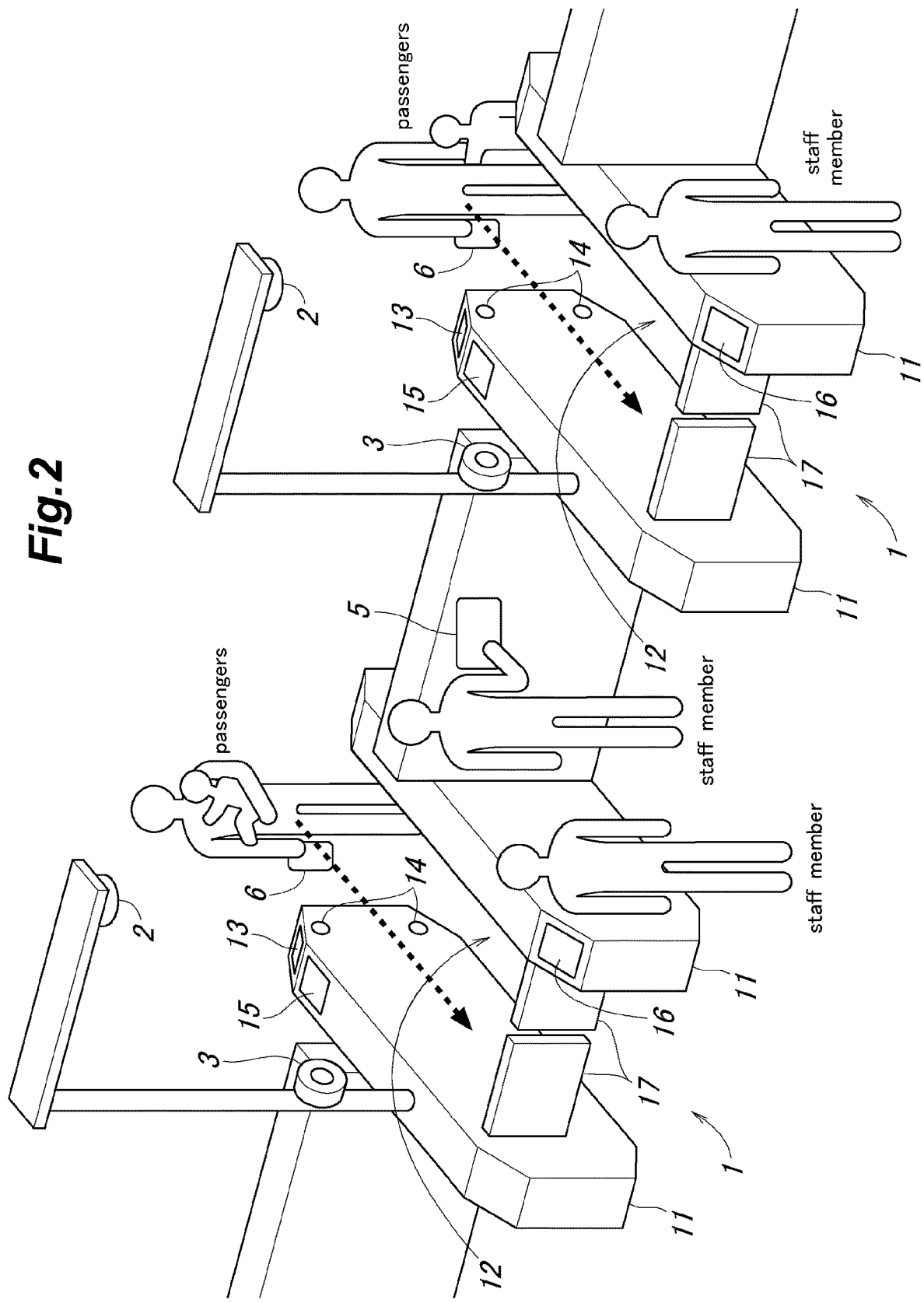
FIG. 2 is an explanatory diagram showing an outline of how gate machines 1, upper cameras 2, and side cameras 3 of the system are configured and provided.

Next, the gate machine 1, the upper camera 2, and the side camera 3 will be described. FIG. 2 is an explanatory diagram showing an outline of how gate machines 1, upper cameras 2, and side cameras 3 of the system are configured and provided.

The gate machine 1 has a pair of main bodies 11 provided on the left and right sides, and a gate passage 12 is defined therebetween. A plurality of people can enter the gate passage 12 at the same time. In the present embodiment, as a general rule, one passenger is allowed to pass through the gate passage 12, and as an exception, when an adult is accompanies a child or an infant, two passengers are allowed to pass at the same time. In other words, the upper limit of the number of persons who can pass through the gate passage 12 at the same time is two, but two adults are not allowed to pass through the gate passage at the same time.

A reader 13 is provided on the entrance side of a main body 11. The reader 13 reads ticket information from a ticket medium 6 possessed by a passenger. In the present embodiment, the reader 13 serves as both an IC card reader and a two-dimensional bar code reader. That is, when a passenger holds an IC card over it, the reader 13 operates as an IC card reader, and when a passenger holds a two-dimensional bar code over it, the reader 13 operates as a two-dimensional bar code reader.

A photoelectric sensor 14 (optical passage sensor) is provided on the entrance side of a main body 11. The gate machine 1 can accurately detect that a person (object) has entered the gate passage 12 based on a detection result of the photoelectric sensor 14. When the photoelectric sensors 14 are provided on the upper and lower sides, the gate machine 1 can determine whether the height of a person who has entered the gate passage 12 is higher or lower than a predetermined height value, thereby determining whether the person entering the gate passage 12 is an adult or a child.

Moreover, a passenger display 15 is provided on the entrance side of a main body 11 so that passengers can view the passenger display 15. The passenger display 15 displays a guidance screen for notifying passengers of guidance information such as flight numbers and destinations for flights now boarding.

A staff display 16 is provided on the exit side of a main body 11 so that staff members can view the staff display 16. The staff display 16 displays a management screen for notifying staff members of information indicating a status of the gate machine 1, and a status of a passenger passing through the gate machine 1, and any other type of information.

A door 17 (flap door), which is selectably openable, is provided on the exit side of a main body 11. When a ticket presented by a passenger is valid and the user (passenger) is to be allowed to enter, the door 17 opens so that the user can pass through the gate passage 12. When the ticket presented by a passenger is fake or invalid and the user (passenger) is to be restricted from entering, the door 17 remains closed so that the user cannot pass through the gate passage 12 and is forced to turn back.

The upper camera 2 is provided above the main bodies 11. The upper camera 2 is an omnidirectional camera, and can shoot the gate passage 12 and its surroundings from above. The upper camera 2 captures an image including the head of a person, and the person's head in the captured image is detected by using an image recognition technique, enabling the system to highly accurately detect a person entering the gate passage 12. For example, the upper camera 2 can detect a person without fail even when a plurality of persons are lined up side by side or when the bodies of a plurality of persons are in close contact with each other viewed from the above. The upper camera 2 can also detect a parent and a small child in a carried-on-the-back state (or in a piggyback state), in which the infant is carried and moved on the back of an adult person.

The side camera 3 is provided above a main body 11. The side camera 3 is a wide-angle camera, and can shoot the gate passage 12 and its surroundings from a side. An image captured by the side camera 3 can show an infant is in a held-in-arms state (i.e., an infant held in the arms of a person), and the infant in the captured image is detected by using an image recognition technique, which enables the system to highly accurately detect an infant is in the held-in-arms state.

Figure 3:
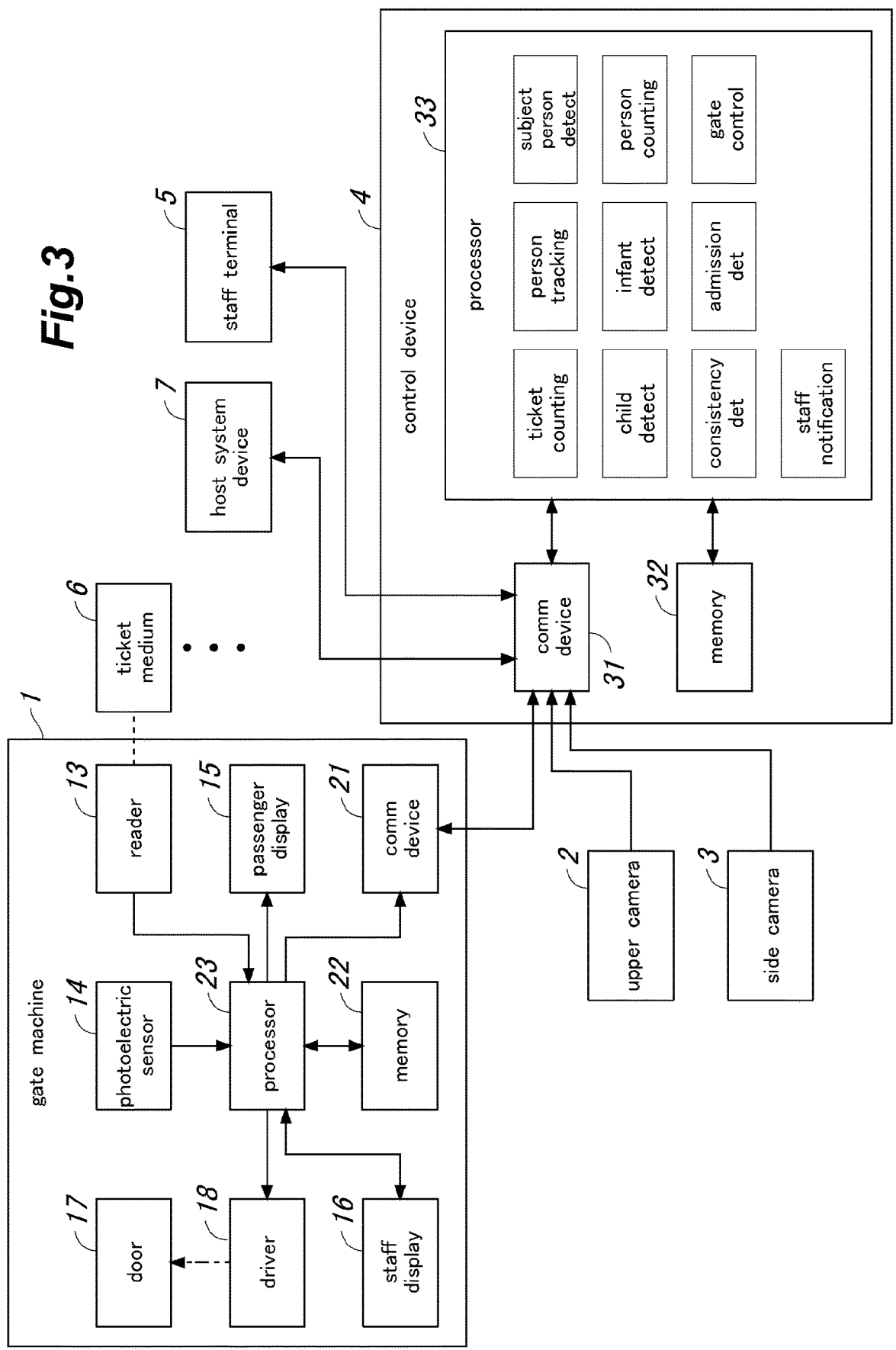
FIG. 3 is a block diagram showing schematic configurations of the gate machine 1 and a control device 4.

Next, schematic configurations of the gate machine 1 and the control device 4 will be described. FIG. 3 is a block diagram showing schematic configurations of a gate machine 1 and a control device 4.

The gate machine 1 includes a reader 13, a photoelectric sensor 14, a passenger display 15, a staff display 16, a door 17, a driver 18, a communication device 21, a memory 22, and a processor 23.

The driver 18 drives the door 17 to open/close in response to an opening/closing command provided from the processor 23.

The communication device 21 communicates with the control device 4. Specifically, the communication device 21 transmits passenger ticket information acquired from a ticket medium 6 by the reader 13 and detection information acquired by the photoelectric sensor 14 to the control device 4. Furthermore, the communication device 21 receives display information for the passenger display 15 and the staff display 16 and control information for controlling the door 17 provided from the control device 4.

The memory 22 stores programs to be executed by the processor 23.

The processor 23 performs various processing operations by executing programs stored in the memory 22. In the present embodiment, the processor 23 controls the passenger display 15 and the staff display 16 to display various screens. The processor 23 also controls the reader 13 to acquire ticket information from ticket media 6.

In some embodiments, the gate machine 1 may be provided with a speaker for providing audio guidance and warning sounds to passengers and staff members.

The control device 4 includes a communication device 31, a memory 32, and a processor 33.

The communication device 31 communicates with the gate machine 1, an upper camera 2, a side camera 3, and the staff terminal 5. Specifically, the communication device 31 receives captured images from the upper camera 2 and the side camera 3. Furthermore, the communication device 31 receives ticket information read by the reader 13 and transmitted from the gate machine 1. Also, the communication device 31 transmits display information for the passenger display 15 and the staff display 16 to the gate machine 1.

The memory 32 stores programs to be executed by the processor 33. In addition, the memory 32 stores passenger information acquired from a host system device 7. The passenger information includes ticket information on tickets of passengers scheduled to board a flight departing from a subject boarding gate(s). Furthermore, the memory 32 stores captured images received from the upper camera 2 and the side camera 3.

In some embodiments, the system may be configured to acquire a set of ticket information for passengers scheduled to board a subject flight from the host system device 7 and store the ticket information in the memory 32 before start inviting passengers to board at the boarding gate.

The processor 33 performs various processing operations by executing programs stored in the memory 32. In the present embodiment, the processor 33 performs operations such as operations for ticket counting, person tracking, subject person detection, child detection, infant detection, person counting, consistency determination, admission determination (determining authorization to board), gate control, and notification to staff.

In the operations for ticket counting, the processor 33 counts the number of tickets read by the reader 13; that is, the (total) number of tickets presented by passengers, based on the ticket information read by the reader 13 from the ticket media 6. The processor 33 also acquires the numbers of persons for respective ticket types (breakdown) based on the ticket type data included in the ticket information.

Different types of tickets are issued for passengers of the respective personal attributes. In the present embodiment, personal attributes, for which corresponding ticket types are issued, include adult, child and infant. A person categorized as "infant" is, for example, one under the age of three, and is not required to pay any fee. A person categorized as "child" is, for example, one aged three or older and less than 120 cm in height, and is required to pay a fee for a child. A person categorized as "adult" is one who are not "infant" or "child", and required to pay a fee for adult.

In the operations for person tracking, the processor 33 detects persons from images captured by the upper camera 2, tracks the persons, and outputs position information indicating positions of each person at respective times as person tracking information.

In the operations for subject person detection, based on the person tracking information acquired in the operations for person tracking and the detection result records of the photoelectric sensor 14, the processor 33 determines whether or not there is a subject person, i.e., a person who has entered the gate passage 12, among the persons that are currently being tracked.

In the operations for child detection, the processor 33 detects a child; that is, a person who walks by themselves and whose height is lower than a predetermined value (for example, 120 cm). Specifically, the processor 33 determines whether or not the height of a person who has entered the gate passage 12 is lower than the predetermined value based on detection result records of the photoelectric sensor 14. Also, the processor 33 estimates the height of the person based on the images captured by the upper camera 2 and the side camera 3. Then, the processor 33 integrates the results of the height determination and the estimation from images to determine whether the person who has entered the gate passage 12 is an adult or a child. In the present embodiment, the operations for child detection involve comparing the detected height with a predetermined value. However, in other embodiments, the operations for child detection may be performed by an identifier with a machine learning model, the machine learning model being built by using a deep learning technology and used to determine whether or not a subject belongs to a child class or a non-child class. In this case, in the operations for child detection, the identifier calculates the likelihood (or probability) that a subject person in a captured image(s) is a child and the likelihood that the subject person is a non-child, and then compares the two calculated likelihoods to determine the subject person is a child or a non-child.

In the operations for infant detection, the processor 33 detects an infant in a held-in-arms state (i.e., an infant held in the arms of an adult), and outputs infant detection information based on images captured by the side camera 3. In the operations for infant detection, the processor 33 can also detect an infant in a held-in-arms state by determining whether there is an infant holding device (infant carrier) such as a carrying strings. An adult may hold an infant in their arm(s) without using any infant holding device, and the processor 33 can also detect an infant in such a held-in-arms state without any device. The infant holding devices may be one used to hold an infant on the front side of the body, one used to hold an infant on the back, or one used to hold an infant on a side of the body. When an adult holds an infant in their arm(s) without using an infant holding device, there are two state of the infant's body; that is, the infant's body may be lying down or sitting up.

The head of an infant is in the carried-on-the-back state can be detected from an image(s) captured by the upper camera 2. Thus, an infant in such a state can be detected as a person based on the images captured by the upper camera 2 in the operations for person tracking. Furthermore, combining infant detection from images captured by the upper camera 2 with information indicating entry of a person (entry of one adult) provided from the photoelectric sensor 14 can improve the accuracy of detection of an infant in carried-on-the-back state. Specifically, since a person detected by the photoelectric sensor 14 is not counted as an infant, an inconsistency occurs between the total number of tickets of one type and that of persons of a corresponding personal attribute, resulting in an inconsistent state. In this case, when visually checking the actual state and confirming that there is no problem, a staff member can perform an operation for providing admission to the persons.

In the operations for person counting, the processor 33 determines the (total) number of in-gate tracked persons (i.e., persons being in the gate passage 12 and tracked using images captured by the upper camera 2) based on the person tracking information acquired in the operations for person tracking. Furthermore, when the operations for infant detection detect infants in the held-in-arms state from images captured by the side camera 3, the processor 33 adds the number of the infants to the number of in-gate tracked persons, thereby determining the number of in-gate persons (i.e., persons present in the gate). When the operations for child detection detect children, the processor 33 subtracts the number of children from the number of in-gate tracked persons, thereby determining the number of adults. In this way, the processor 33 can acquire the total number of in-gate persons and the breakdown, i.e., the numbers of persons for the respective personal attributes (adult, child, and infant).

In the operations for consistency determination, the processor 33 compares the number of tickets read by the reader in the operations for ticket counting, with the number of in-gate persons determined in the operations for person counting, to thereby determine if the consistency between the two numbers is achieved. Specifically, when the number of tickets read by the reader and the number of in-gate persons are consistent in both the total number and the breakdown, the processor 33 determines that the consistency is achieved. In other words, when the number of persons for each of the ticket types (adult, child, and infant) and that for a corresponding personal attribute (adult, child, or infant) are consistent, the processor 33 determines that the consistency is achieved. When the number of in-gate persons is greater than the number of read tickets, the processor 33 determines that tailgating occurs.

When the operations for consistency determination determine that the number of read tickets is consistent with that of in-gate persons, in the operations for admission determination, the processor 33 checks ticket information presented by passengers against ticket information records of the passenger invited to board at the boarding gate to thereby determine whether to provide admission to the visitors (performing a ticket examination operation). The processor 33 acquires ticket information records of the passenger invited to board, from the host system device 7.

In the operation for gate control, the processor 33 controls the opening and closing of the door 17 according to the result of the operations for admission determination. Specifically, the processor 33 controls the door such that, when a visitor is authorized to board, the door 17 is opened, and otherwise the door 17 remains closed.

In the operations for notification to staff, the processor 33 notifies a staff member of consistency determination result information. In the present embodiment, the processor 33 generates a management screen including the consistency determination result information, and displays the management screen on the staff display 16 of the gate machine 1. Furthermore, in response to an instruction provided by a staff member, the processor 33 displays images captured by the upper camera 2 and the side camera 3 on the staff display 16. In other embodiments, the gate machine 1 may be provided with a speaker for notifying staff members of the consistency determination result information by voice or sound.

In the operations for notification to staff, the processor 33 also causes the staff terminal 5 to display a management screen similar to that displayed on the staff display 16 of the gate machine 1. The staff terminal 5 may display exactly the same management screen as that displayed on the staff display 16 of the gate machine 1. Alternatively, the staff terminal 5 may display information about multiple gate machines 1 at the boarding gate on a single screen.

Figure 4:
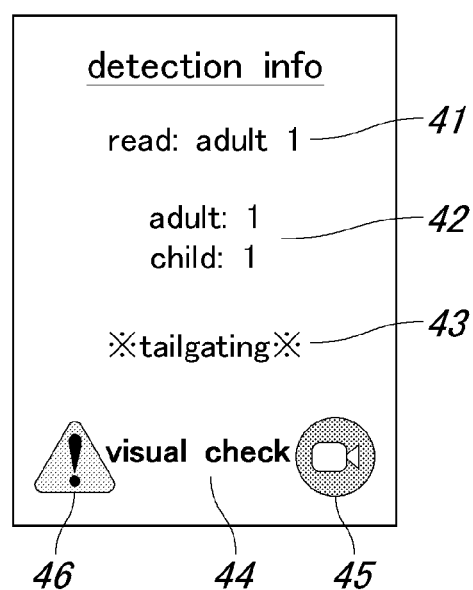
FIG. 4 is an explanatory diagram showing a management screen displayed on a staff display 16 of the gate machine 1.

Next, management screens displayed on the staff display 16 of the gate machine 1 will be described. FIG. 4 is an explanatory diagram showing a management screen displayed on the staff display 16 of the gate machine 1.

The management screen includes a read ticket count indicator 41 and an in-gate person count indicator 42. The read ticket count indicator 41 indicates the number of read tickets for the respective ticket types (adult, child, and infant). The in-gate person count indicator 42 indicates the number of in-gate persons for the respective personal attributes (adult, child, and infant).

Furthermore, the management screen includes letters "visual check" 44 and a play button 45. When a user operates the play button 45, the screen transitions to a play screen (not shown). Captured images including a subject person(s) can be replayed on the play screen. The captured images can be replayed as a moving image, i.e., a video.

When the processor performs the operations for consistency determination to determine that an inconsistent state occurs; that is, there is an inconsistency between the number of read tickets and that of in-gate persons, the management screen displays an inconsistency alert message 43. The displayed inconsistency alert message differs depending on what type of inconsistency occurs.

When an inconsistent state occurs, the letters "visual check" 44 are highlighted. Specifically, the color of the letters "visual check" 44 change to a predetermined color (for example, red), which encourages a staff member to visually check an actual state of a person(s) passing through the gate.

When an inconsistent state occurs, the management screen displays an alert mark 46, which quickly notifies a staff that there is an inconsistency between the number of read tickets and that of in-gate persons; that is, unauthorized entry of a passenger is occurring.

Figure 6:
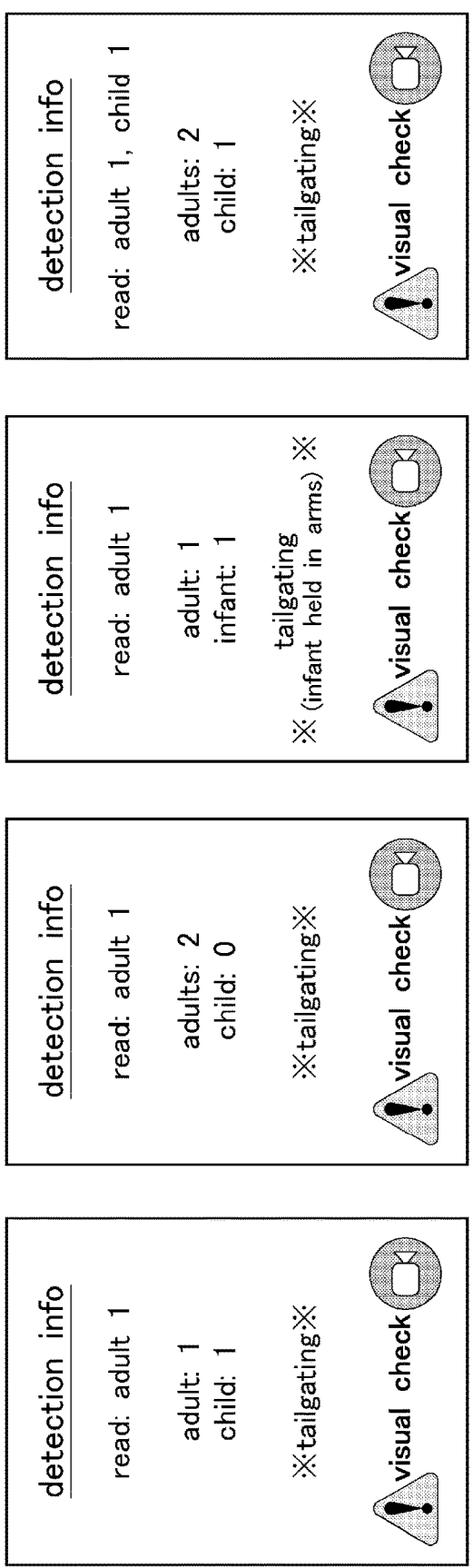
FIG. 6 is an explanatory diagram showing examples of inconsistent states in which inconsistencies occur regarding the numbers of persons.
Figure 8:
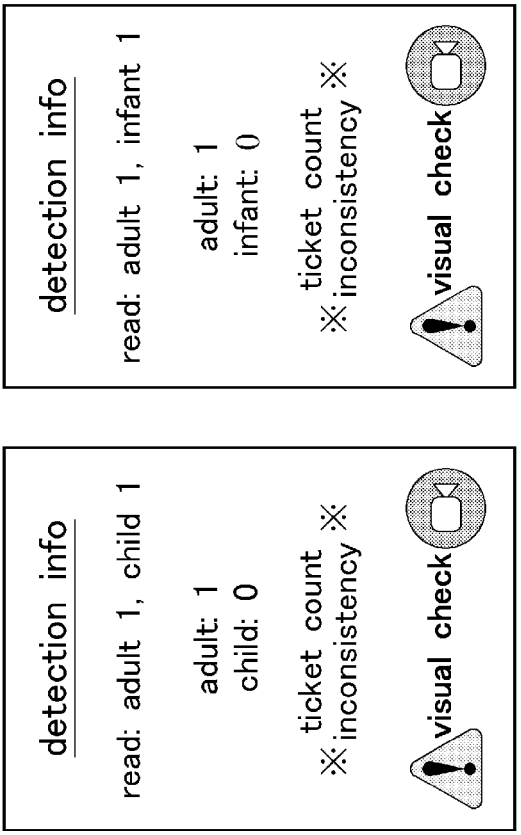
FIG. 8 is an explanatory diagram showing examples of inconsistent states in which inconsistencies occur regarding the numbers of persons.
Figure 9:
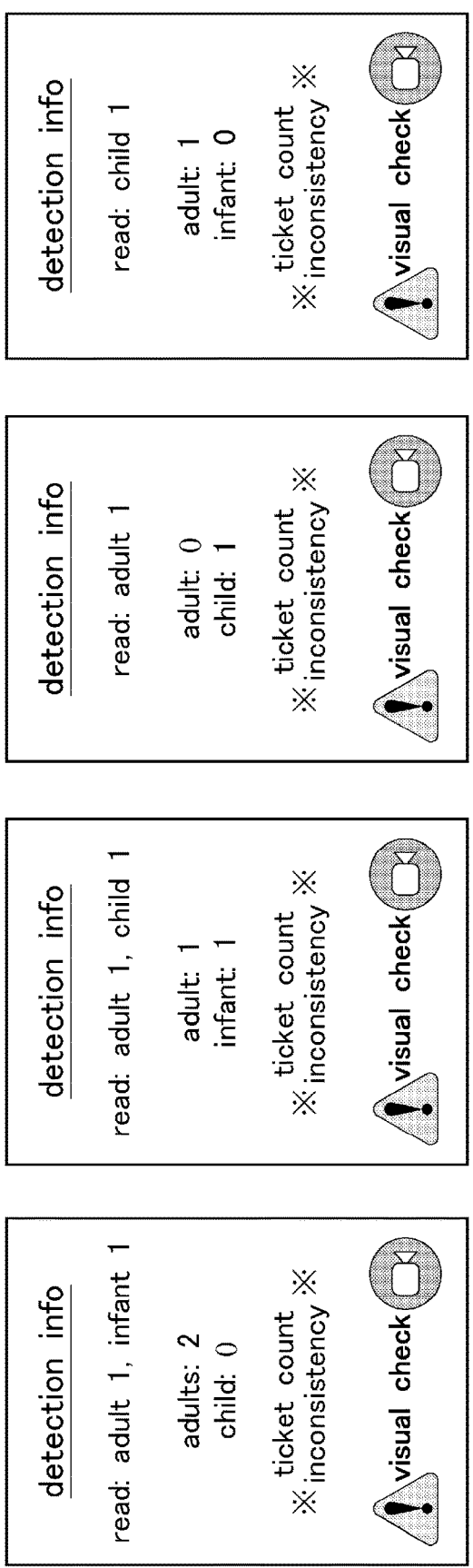
FIG. 9 is an explanatory diagram showing examples of inconsistent states in which inconsistencies occur between ticket types and personal attributes.
Figure 10:
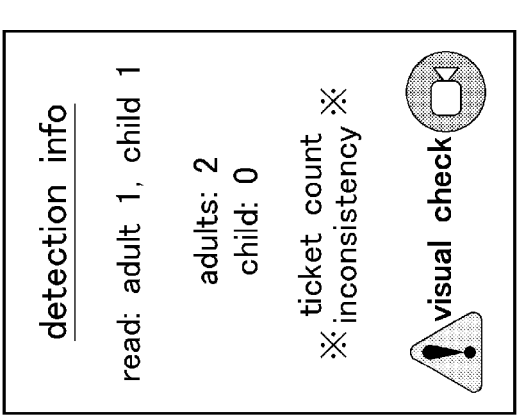
FIG. 10 is an explanatory diagram showing examples of inconsistent states in which inconsistencies occur between ticket types and personal attributes.

Next, specific examples of normal states and inconsistent states will be described. FIG. 5 is an explanatory diagram showing examples of normal states. FIGS. 6 to 8 are explanatory diagrams showing examples of inconsistent states in which inconsistencies occur regarding the numbers of persons. FIGS. 9 and 10 are explanatory diagrams showing examples of inconsistent states in which inconsistencies occur between ticket types and personal attributes. In FIGS. 9 and 10, each of the top boxes shows the total and breakdown of the number of read tickets and the number of in-gate persons, and each of the bottom boxes indicate a management screen displayed on the staff display 16 showing detection info.

Each example shown in FIG. 5 is a normal state, in which there is no inconsistency in both the total and the breakdown of the number of read tickets and the number of in-gate persons. Specifically, the total number of read tickets is consistent with that of in-gate persons, and the number of read tickets for each ticket type is consistent with that of in-gate persons for a corresponding personal attribute.

Each example shown in FIGS. 6 to 8 is an inconsistent state, in which there is an inconsistency between the total number of read tickets and that of in-gate persons. Specifically, the total number of read tickets is inconsistent with that of in-gate persons.

Each of the examples shown in FIGS. 6 and 7 is a case where the total number of in-gate persons is greater than that of read tickets, which means the occurrence of tailgating. In this case, the management screen indicates an inconsistency alert message "tailgating" as inconsistency information. Furthermore, when the system detects an infant in a held-in-arms state, as shown in FIG. 6 bottom third box and FIG. 7 bottom third box, the management screen indicates an inconsistency alert message "infant held-in-arms tailgating" as inconsistency information.

Each of the examples shown in FIG. 8 is a case where the total number of in-gate persons is less than that of read tickets. In this case, the management screen indicates an inconsistency alert message "ticket count inconsistency" as inconsistency information.

Each of the examples shown in FIGS. 9 and 10 is an inconsistent state, in which there is no inconsistency in the total between the number of read tickets and that of in-gate persons, but there is an inconsistency in the breakdown therebetween. Specifically, the numbers of read tickets for each ticket type is not consistent with that of in-gate persons for a corresponding personal attribute. In this case, the management screen indicates an inconsistency alert message "ticket count inconsistency" as inconsistency information.

When a visitor fails to properly present a ticket of the type corresponding to a personal attribute of the visitor, in particular, when a visitor fails to present tickets for all persons entering the gate passage 12, an inconsistent state occurs in which the total number of in-gate persons is greater than that of read tickets as in the examples shown in FIGS. 6 and 7.

In the case of failure in person tracking using images captured by the upper camera 2, or failure in infant detection using images captured by the side camera 3, which results in that the total number of detected in-gate persons is less than the actual total number of in-gate persons, an inconsistent state occurs in which the total number of in-gate persons is less than that of read tickets as in the examples shown in FIG. 8. In particular, the example shown in FIG. 8 first top box is a case where tracking a child person fails, and the example shown in FIG. 8 second top box is a case where infant detection fails.

In the case where an infant is in the carried-on-the-back state; that is, person tracking using images captured by the upper camera 2 detects an infant as an adult, a miscounting state occurs in which the count of adults includes the number of the infant as in the example of FIG. 9 first top box. In the case where a child is held in the arms of an adult, a miscounting state occurs in which the count of infants includes the number of the child as in the example of FIG. 9 first top box. In the case of failure in child detection based on a detection result of the photoelectric sensor 14, a miscounting state occurs in which the count of adults or children includes the number of the child or adult as in the examples of FIG. 9 third top box and 9 fourth top box, and FIG. 10. As described earlier, combining person tracking information based on images captured by the upper camera 2 with information indicating entry of a person provided from the photoelectric sensor 14, improves the accuracy of detection of an infant in carried-on-the-back state, which further enables the determination of the presence of a miscounting state in consideration of a detected infant in carried-on-the-back state.

Although the examples of management screens shown in FIGS. 4 to 10 are displayed on the staff display 16 of the gate machine 1, the staff terminal 5 can also display such management screens.

Figure 11:
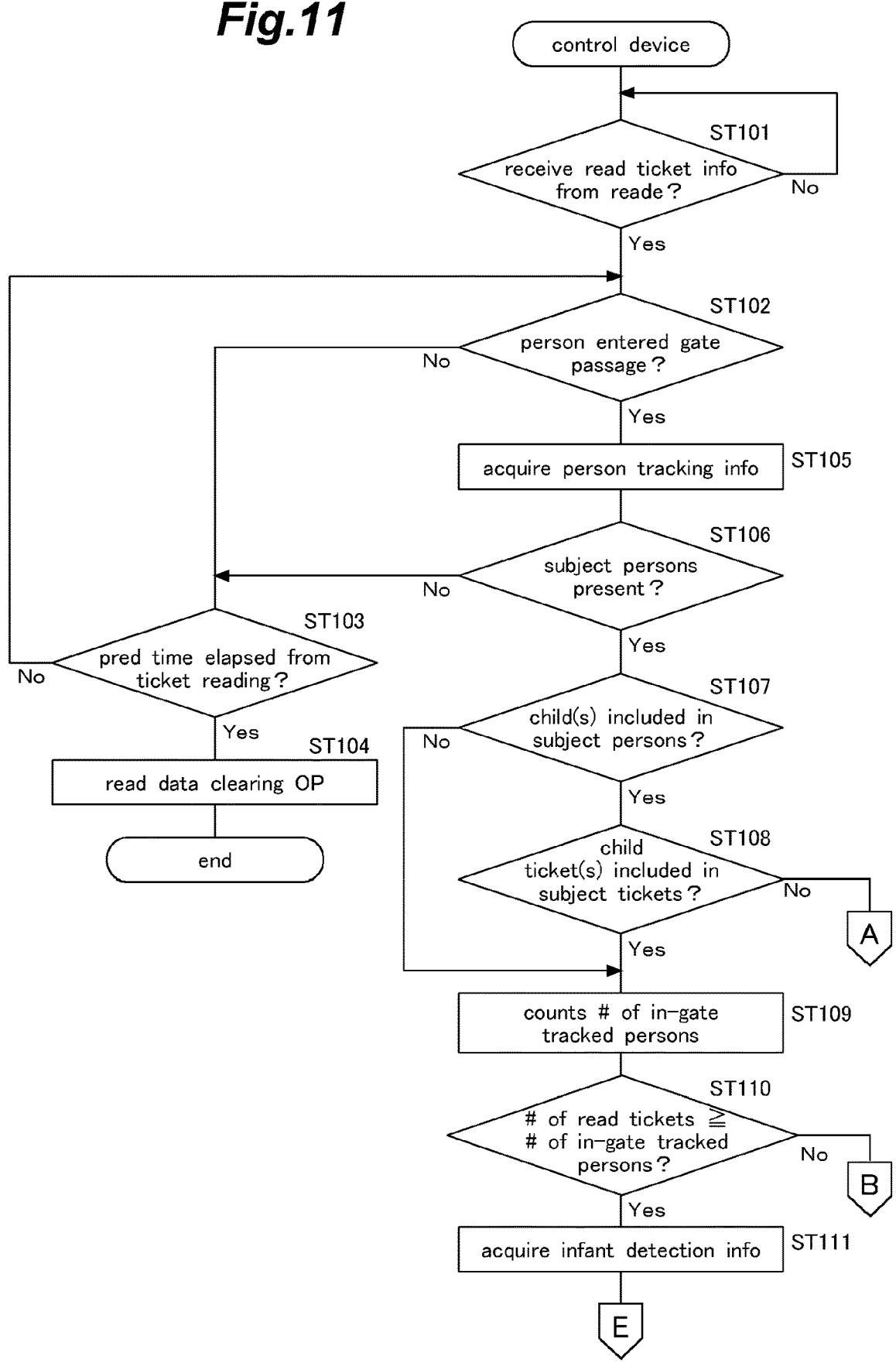
FIG. 11 is a flow diagram showing an operation procedure of operations performed by a processor 33 of the control device 4.
Figure 12:
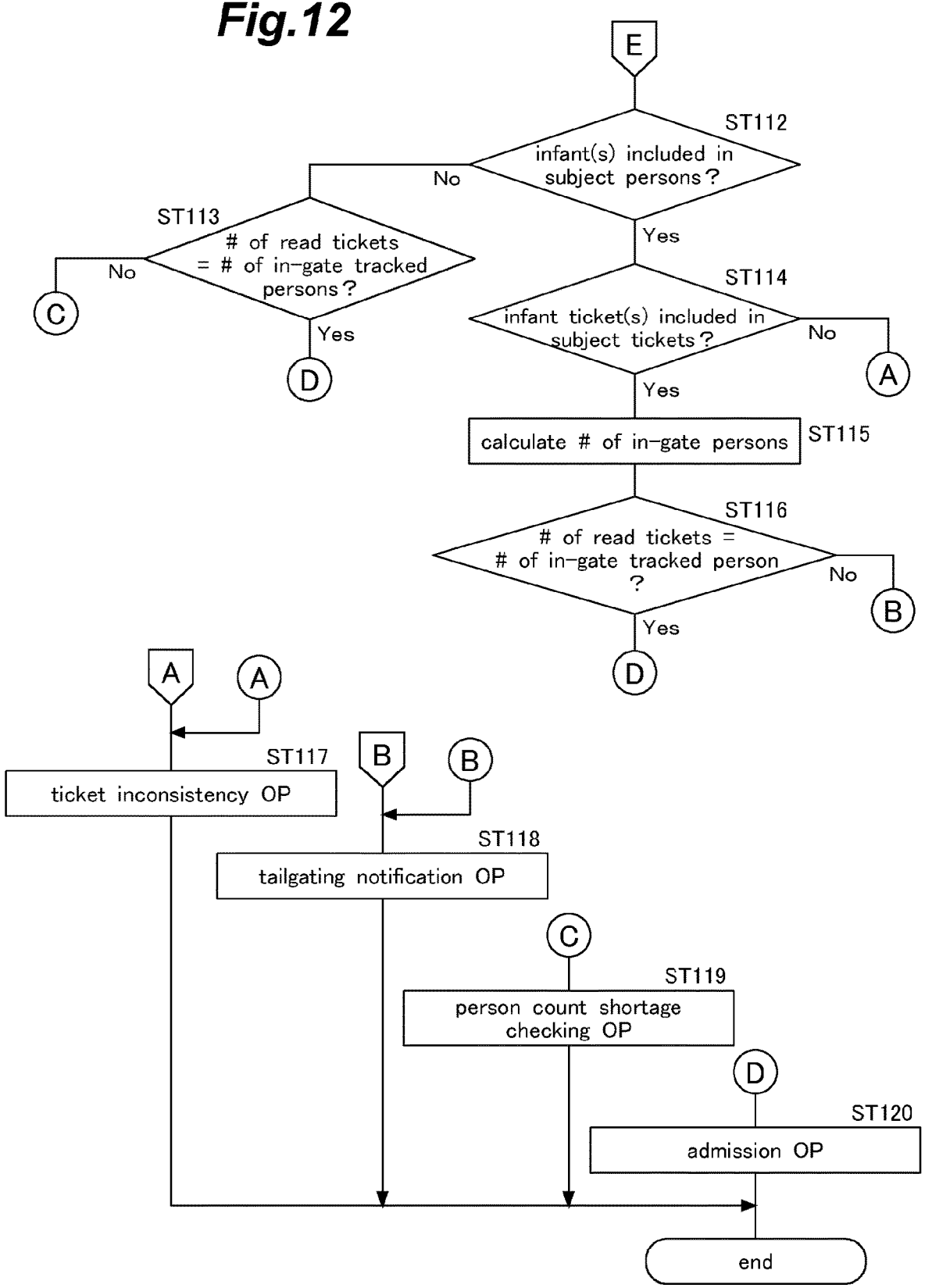
FIG. 12 is a flow diagram showing an operation procedure of operations performed by the processor 33 of the control device 4.

Next, an operation procedure of operations performed by the processor 33 of the control device 4 will be described. FIGS. 11 and 12 show a flow diagram showing an operation procedure of operations performed by the processor 33 of the control device 4.

After a passenger holds the ticket medium 6 over the reader 13 at the gate machine 1 so that the reader 13 can read ticket information from the ticket medium 6, when the processor 33 of the control device 4 receives the read ticket information from the gate machine 1 (Yes in ST101), then the processor 33 determines whether or not a person (object) has entered the gate passage 12 based on the detection result of the photoelectric sensor 14 (ST102).

When determining that no person has entered the gate passage 12 (No in ST102), the processor 33 determines whether or not a predetermined period of time has elapsed from the ticket reading (ST103).

When determining that the predetermined period of time has elapsed from the ticket reading (Yes in ST103), which means that the passenger has held the ticket medium 6 over the reader 13 but turned back without entering the gate passage 12, the processor 33 performs a read data clearing operation (ST104). In the read data clearing operation, the processor 33 clears the received ticket information, displays a management screen on the staff display 16 to notify a staff member that the read data clearing operation has been performed, and performs gate control to close the door 17.

When determining that the predetermined period of time has not elapsed from the ticket reading (No in ST103), the process returns to ST102.

When determining that a person(s) has entered the gate passage 12 (Yes in ST102), the processor 33 then acquires person tracking information based on images captured by the upper camera 2 (ST105). Then, the processor 33 determines, based on the person tracking information, whether or not there is a subject person(s), i.e., the person(s) who has entered the gate passage 12, among the persons that are currently being tracked (ST106).

When determining that there is no subject person (No in ST106), the processor 33 causes the process to proceed to ST103.

When determining that there are one or more subject persons among the persons that are currently tracked (Yes in ST106), then the processor 33 determines whether or not there is a child in the subject persons.

When determining that there is a child among the subject persons (Yes in ST107), then the processor 33 determines whether or not there is a child ticket among subject tickets, i.e., tickets that are currently being processed (ST108).

When determining that there is no child ticket among the subject tickets (No in ST108), which means that there is an inconsistency between ticket types and personal attributes, the processor 33 performs a ticket inconsistency operation (ST117). In the ticket inconsistency operation, the processor 33 displays a management screen indicating the occurrence of an inconsistent state on the staff display 16, and performs gate control to close the door 17.

When determining that there is no child among the subject persons (No in ST107) or there is a child ticket among the subject tickets (Yes in ST108), the processor 33 counts the number of persons present in the gate passage 12 among the persons that are currently being tracked (i.e., counts the number of in-gate tracked persons) (ST109), and determines whether or not the number of read tickets is equal to or greater than that of in-gate tracked persons (ST110).

When determining that the number of read tickets is less than that of in-gate tracked persons (No in ST110), which means that the number of persons present in the gate passage 12 is greater than that of read tickets, the processor 33 performs a tailgating notification operation (ST118). In the tailgating notification operation, the processor 33 displays a management screen on the staff display 16 to notify a staff member that tailgating is detected, and performs gate control to close the door 17.

When determining that the number of read tickets is equal to or greater than that of in-gate tracked persons (Yes in ST110), the processor 33 acquires infant detection information (ST111), and determines whether or not there is an infant in the subject persons based on the infant detection information (ST112).

When determining that there is no infant among the subject persons (No in ST112), the processor 33 determines whether or not the number of read tickets is consistent with that of in-gate tracked persons (ST113).

When determining that the number of read tickets is inconsistent with that of in-gate tracked persons, the processor 33 performs a person count shortage checking operation (ST119). In the person count shortage checking operation, the processor 33 displays a management screen on the staff display 16 to thereby notify a staff member of detection of a person count shortage, and performs gate control to close the door 17.

When determining that the number of read tickets is consistent with that of in-gate tracked persons (Yes in ST113), the processor 33 performs an admission operation (ST120). In the admission operation, the processor 33 performs gate control to open the door 17.

When determining that there is an infant in the subject persons (Yes in ST112), the processor 33 then determines whether or not there is an infant ticket among the subject tickets (ST114).

When determining that there is no infant ticket among the subject tickets (No in ST114), the processor 33 performs a ticket inconsistency operation (ST117). In ticket inconsistency operation, the processor 33 displays a management screen indicating the occurrence of an inconsistent state on the staff display 16, and performs gate control to close the door 17.

When determining that there are one or more infant tickets among the read tickets (Yes in ST114), then the processor 33 calculates the number of in-gate persons by adding the number of infants in the held-in-arms state to the number of in-gate tracked persons (ST115), and determines whether or not the number of read tickets is consistent with that of in-gate persons (ST116).

When determining that the number of read tickets is not consistent with the number of in-gate persons (No in ST116), the processor 33 performs the tailgating notification operation. In the tailgating notification operation, the processor 33 displays a management screen on the staff display 16 to notify a staff member that tailgating is detected, and performs gate control to close the door 17.

When determining that the number of read tickets is consistent with the number of in-gate persons (Yes in ST116), the processor 33 performs the admission operation (ST120). In the admission operation, the processor 33 performs gate control to open the door 17.

Specific embodiments of the present invention are described herein for illustrative purposes. However, the present invention is not limited to those specific embodiments, and various changes, substitutions, additions, and omissions may be made to features of the embodiments without departing from the scope of the invention. In addition, elements and features of the different embodiments may be combined with each other to yield an embodiment which is within the scope of the present invention.

INDUSTRIAL APPLICABILITY

A visitor management system and a visitor management method according to the present invention can accurately determine whether or not a visitor properly presents a ticket of the type corresponding to a personal attribute of the visitor, thereby enabling a staff member to precisely confirm whether or not the visitor is authorized to enter, and are useful as a visitor management system and a visitor management method for providing admission to a visitor based on ticket information presented by the visitor.

Glossary 1 gate machine
2 upper camera
3 side camera
4 control device (data processing device)
5 staff terminal
6 ticket medium
7 host system device
11 main body
12 gate passage
13 reader
14 photoelectric sensor
15 passenger display
16 staff display
41 read ticket count indicator
42 in-gate person count indicator
42 play button
46 alert mark

The invention claimed is:

1. A visitor management system for allowing one or more visitors to pass through a gate based on ticket information presented by the one or more visitors, the visitor management system comprising:
  a reader configured to read ticket information recorded in
    a ticket medium possessed by the one or more visitors entering a gate passage at an entrance of the gate, the ticket information including a ticket type;
  a camera configured to capture an image of the one or more visitors in the gate passage;
  a data processing device configured to:
  acquire a personal attribute of each visitor from the image of each visitor captured by the camera, acquire number of visitors for each ticket type included in the ticket information acquired by the reader and a number of visitors in the gate passage for each personal attribute, determine whether or not consistency is achieved between the acquired number of visitors in the gate passage for each personal attribute and the acquired number of visitors for each ticket type to thereby provide determination result information, and generate a management screen including the determination result information; and a display configured to display the management screen generated by the data processing device;

wherein the data processing device performs an admission operation when a plurality of visitors is in the gate passage to allow the plurality of visitors to pass through the gate, which is mechanically controlled to be selectively openable based on a command from a processor associated with the data processing device, based on a determination that consistency is achieved between the number of visitors for each ticket type and the number of visitors in the gate passage for each personal attribute, and wherein the data processing device generates the determination result information inconsistency information indicating that consistency is not achieved upon determining that consistency is not achieved between the number of visitors for each ticket type and the number of visitors in the gate passage for each personal attribute and provides a command to the processor to mechanically control the gate to be closed when the consistency is not achieved.

2. The visitor management system according to claim 1, wherein the data processing device generates, as the determination result information, tailgating information indicating a situation in which either a child or an infant, or both accompanied by the visitor are tailgating the visitor.

3. The visitor management system according to claim 1, wherein the data processing device determines that a child is held by an adult visitor from the image captured by the camera, and generates, as the determination result information, raised child information indicating a situation in which the child is raised by the adult visitor.

4. The visitor management system according to claim 1, wherein the data processing device is configured to generate the management screen which includes a play button used to start a playback of the image captured by the camera.

5. A visitor management method for allowing one or more visitors to pass through a gate based on ticket information presented by the one or more visitors, the method being performed by a visitor management system, the method comprising:

obtaining ticket information acquired by a reader from a ticket medium possessed by the one or more visitors entering a gate passage at an entrance of the gate, the ticket information including a ticket type;

capturing, by a camera, an image of the one or more visitors in the gate passage;

acquiring, by a data processing device, a personal attribute of each visitor from the image of each visitor captured by the camera;

acquiring, by the data processing device, a number of visitors for each ticket type included in the ticket information acquired by the reader and a number of visitors in the gate passage for each personal attribute;

acquiring, by the data processing device, a number of visitors for each ticket type included in the ticket information acquired by the reader and a number of visitors in the gate passage for each personal attribute;

determining, by the data processing device, whether or not consistency is achieved between the acquired number of the visitors in the gate passage for each personal attribute of the visitor and the acquired number of visitors for each ticket type to thereby provide determination result information;

generating a management screen including the determination result information; and displaying the generated management screen;

wherein the data processing device performs an admission operation when a plurality of visitors is in the gate passage to allow the plurality of visitors to pass through the gate, which is mechanically controlled to be selectively openable based on a command from a processor associated with the data processing device, based on a determination that consistency is achieved between the number of visitors for each ticket type and the number of visitors in the gate passage for each personal attribute, and wherein the data processing device generates the determination result information inconsistency information indicating that consistency is not achieved upon determining that consistency is not achieved between the number of visitors for each ticket type and the number of visitors in the gate passage for each personal attribute and provides a command to the processor to mechanically control the gate to be closed when the consistency is not achieved.

* * * * *